United States Patent
Zhang et al.

(10) Patent No.: US 10,530,735 B2
(45) Date of Patent: Jan. 7, 2020

(54) PRO-ACTIVE MECHANISM TO DETECT LISP MOVABLE SILENT HOST

(71) Applicant: Cisco Technology, Inc., San Jose, CA (US)

(72) Inventors: Xiaopu Zhang, Shanghai (CN); Yuefeng Jiang, Shanghai (CN); Fang Yang, Shanghai (CN)

(73) Assignee: Cisco Technology, Inc., San Jose, CA (US)

( * ) Notice: Subject to any disclaimer, the term of this patent is extended or adjusted under 35 U.S.C. 154(b) by 623 days.

(21) Appl. No.: 14/850,090

(22) Filed: Sep. 10, 2015

(65) Prior Publication Data

US 2017/0078241 A1    Mar. 16, 2017

(51) Int. Cl.
*H04L 29/12*    (2006.01)
*H04L 29/08*    (2006.01)
*H04L 12/751*    (2013.01)

(52) U.S. Cl.
CPC ............ *H04L 61/103* (2013.01); *H04L 45/02* (2013.01); *H04L 67/10* (2013.01)

(58) Field of Classification Search
CPC ......... G06F 15/17375; G06F 15/17381; H04L 45/02; H04L 47/70; H04L 61/103; H04L 61/2007; H04L 61/2084; H04L 67/10; H04L 67/2842
See application file for complete search history.

(56) References Cited

U.S. PATENT DOCUMENTS

| | | | | |
|---|---|---|---|---|
| 9,276,871 | B1* | 3/2016 | Freitas et al. | H04L 45/64 370/238 |
| 2012/0144031 | A1* | 6/2012 | Hu | |
| 2012/0155442 | A1* | 6/2012 | Haddad | H04W 8/065 370/338 |
| 2012/0173694 | A1 | 7/2012 | Yan et al. | |
| 2012/0314714 | A1 | 12/2012 | Hu et al. | |
| 2013/0198369 | A1* | 8/2013 | Kim | H04L 61/2084 709/224 |
| 2014/0269702 | A1* | 9/2014 | Moreno | H04L 45/64 370/390 |

(Continued)

OTHER PUBLICATIONS

"LISP ESM Multihop Mobility", IP Routing: LISP Configuration Guide, Cisco IOS Release 15M&T, Jul. 27, 2012, 19 pages.

(Continued)

*Primary Examiner* — Marsha D Banks Harold
*Assistant Examiner* — Dharmesh J Patel
(74) *Attorney, Agent, or Firm* — Edell, Shapiro & Finnan, LLC

(57) ABSTRACT

A network device may receive a request seeking a location identifier for an endpoint identifier from a first router. The network device may determine that the endpoint identifier belongs to a dynamic endpoint identifier range associated with a plurality of routers. The request may be forwarded to the plurality of routers to discover a host having the endpoint identifier and a notification may be received from one of the plurality of routers reporting discovery of the host having the endpoint identifier. The network device may send an identifier of the one of the plurality of routers which reports discovery of the host to the first router as the location identifier for the endpoint identifier.

20 Claims, 6 Drawing Sheets

(56) References Cited

U.S. PATENT DOCUMENTS

2014/0297875 A1 10/2014 Cheng et al.
2014/0301387 A1 10/2014 Subramanian et al.

OTHER PUBLICATIONS

"Locater ID Separation Protocol (LISP) Overview", IP Routing: LISP Configuration Guide, Cisco IOS Release 15M&T, Jul. 27, 2012, 9 pages.
C. Cassar et al., "LISP RLOC Membership Distribution", Network Working Group, Internet Draft, Sep. 22, 2014, 16 pages.

* cited by examiner

PRO-ACTIVE MECHANISM TO DETECT LISP MOVABLE SILENT HOST

TECHNICAL FIELD

The present disclosure relates to communication networks, and in particular, to detection of a silent host in a communications network.

BACKGROUND

Cloud-based data centers typically use virtualization to serve computing needs to various clients. The increasing use of virtualization in networks has enabled a great amount of flexibility in managing servers and workloads. One important aspect of this flexibility is mobility. Detection of host moves and status in conventional systems have a number of challenges, including time for detection, limitations of detection based on type of traffic, and high amount of processing resources needed. Moreover, some movable host may be silent. That is, they do not register themselves with any mapping service when they are running. This is a serious issue because other hosts or clients do not know how to find a silent host and cannot use any services being provided by the silent host.

DESCRIPTION OF EXAMPLE EMBODIMENTS

Overview

Techniques are provided for pro-actively detecting a host in a communications network. According to one embodiment, a network device may receive a request seeking a location identifier for an endpoint identifier from a first router. The network device may determine that the endpoint identifier belongs to a dynamic endpoint identifier range associated with a plurality of routers. The request may be forwarded to the plurality of routers to discover a host having the endpoint identifier and a notification may be received from one of the plurality of routers reporting discovery of the host having the endpoint identifier. The network device may send an identifier of the one of the plurality of routers which reports discovery of the host to the first router as the location identifier for the endpoint identifier.

Example Embodiments

Network protocols, such as Locator Identifier Separation Protocol (LISP), have been developed that use routing locators and endpoint identifiers to improve the scalability of a routing system. These network protocols may provide a mechanism to separate out identification and location semantics from the current definition of an IP address. In LISP, for example, an endpoint, such as a host, may have an endpoint identifier (EID). The endpoint may be attached to a location, such as a router, which may have a separate identifier referred to as a routing locator (RLOC). Therefore, in LISP, IP address semantics may be extended to incorporate a distinction between routing locators (RLOCs) for routing through core networks and endpoint identifiers (EIDs) for identifying network endpoints (e.g., hosts) attached to a router.

In a network environment, such as data center interconnect (DCI), a mapping server may be provided to implement a network protocol that uses routing locators and endpoint identifiers for routing. In such an environment, a router may be configured to be an edge device for a plurality of endpoints (e.g., hosts) and the router's identifier may be the routing locator for the plurality of endpoints. The mapping server and the router may be configured to discover a host among the plurality of hosts attached to the router even if the host may be a silent host that does not advertise its location and thus is configured to transmit and receive data packets without first registering itself with a router and a mapping server (described below).

Figure 1:
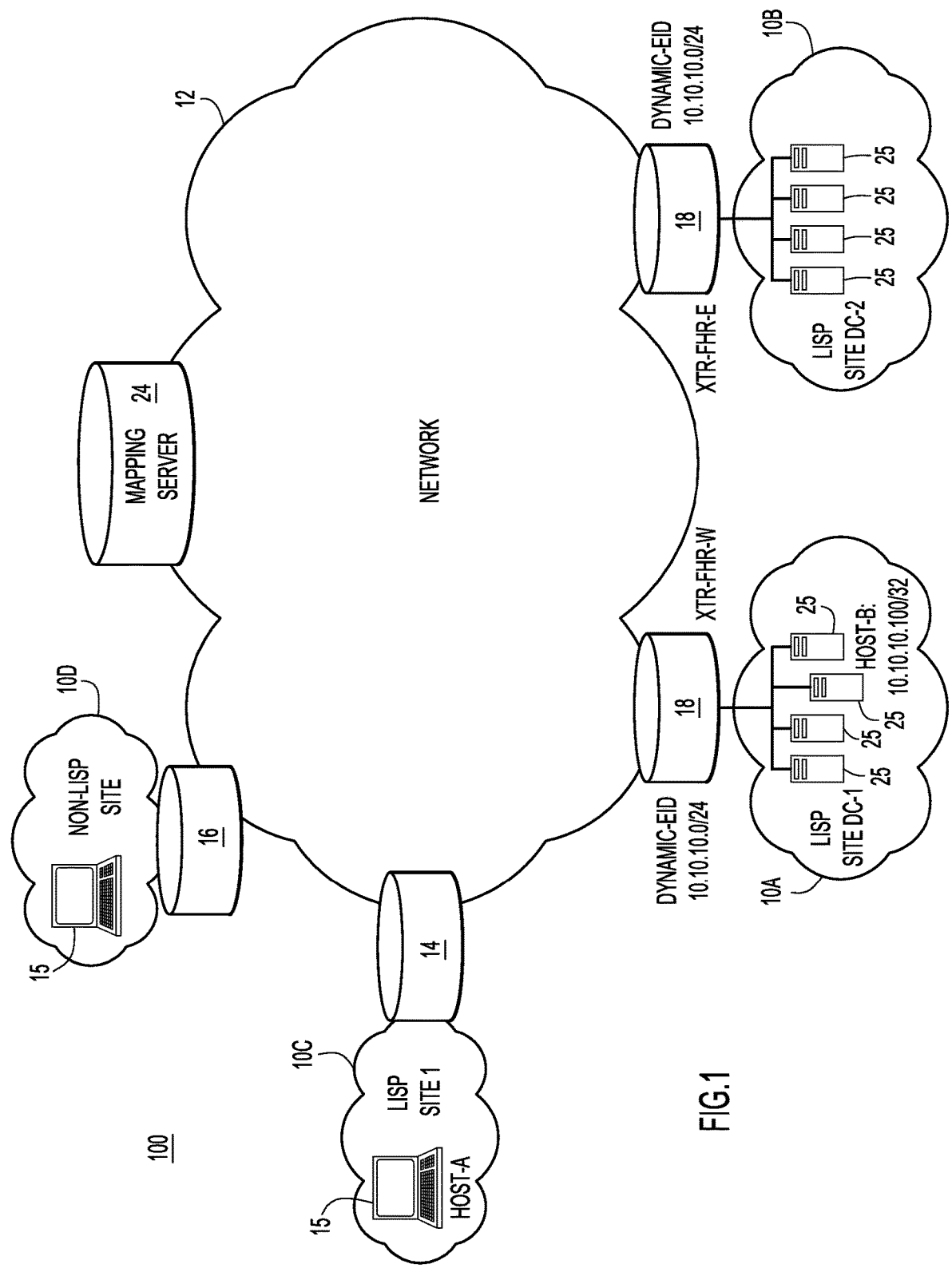
FIG. 1 is a system diagram illustrating a networking environment in which a movable silent host may be detected, according to an example embodiment.

With reference to FIG. 1 there is shown an example network environment 100 in which pro-active movable silent host detection techniques are implemented. The network environment 100 may comprise a plurality of network sites 10A, 10B, 10C, 10D that are in communication through a network 12. The network sites may be, for example, data center(s) (e.g., a LISP Site Data Center (DC)-1 as site 10A and a LISP Site DC-2 as site 10B) and/or, group(s) of network devices (e.g., a LISP Site 1 as site 10C and a non-LISP site as site 10D). The network 12 may be, for example, a L2 metro Ethernet core, L3 IP network, MPLS, or any other type of network. Each network site 10A, 10B, 10C, 10D and the network 12 may include any number of edge devices or intermediate (core) nodes (e.g., routers, switches, access layer devices, gateways, or other network devices), which facilitate passage of data within the network.

As shown in FIG. 1, the network sites 10A, 10B and 10C may be examples of LISP network sites and the network site 10D may be an example of one or more non-LISP network sites. The LISP network sites may each comprise an edge device 14 or edge device 18. The edge devices 14, 18 may be routers, switches, gateways, or other network devices configured to perform routing or forwarding functions (e.g., L2, L3, or L2/L3 devices) and support a locator/identifier separation method. In one embodiment, each of the edge devices 14 and 18 may be configured as an xTunnel Router (xTR) to perform operations in accordance with LISP. In this example, an xTR may comprise an Ingress TR (ITR) or Egress TR (ETR) depending on whether the traffic is in ingress traffic or egress traffic with respect to that router in accordance with LISP parlance (i.e., traffic into the router from an endpoint is ingress traffic while traffic from the router to the endpoint is egress traffic). The non-LISP network site 10D may include an edge device 16 in communication with the network 12. The network site 10D is not configured as a LISP site, and therefore does not include an xTR. The edge device 16, however, may be configured to perform proxy xTR (PxTR) functions which may facilitate a non-LISP site (e.g., site 10D) to interoperate with a LISP site (e.g., sites 10A, 10B, and 10C).

As previously described, LISP creates two address (name) spaces: endpoint identifiers (EIDs), which are assigned to endpoints; and routing locators (RLOCs), which are assigned to network devices to indicate locations within a network topology. EID reachability across LISP sites 10A, 10B, and 10C may be achieved by resolving EID-to-RLOC mappings. Reachability within the RLOC space (e.g., network 12) may be achieved by any routing methods (e.g., IP routing using RLOC as IP source and destination addresses).

It is to be understood that LISP is used herein as an example and that other protocols that provide a locator/identifier split may be used, without departing from the scope of the embodiments. Thus, the term "locator identifier separation protocol" as used herein may refer to any protocol that provides a separation between an object identifier and its location.

Network sites 10C and 10D may each include any number of endpoints (stations, user devices, clients, client devices) 15. Each endpoint 15 may be, for example, a personal computer, set-top box, telepresence device, television, cellular phone, tablet, laptop, personal digital assistant, portable computing device, multimedia device, and the like. It should be noted that the network sites 10C and 10D may also include endpoints that may be virtual machines. For example, the Host-A in site 10C may be a laptop or a virtual machine.

Network site 10A and 10B may each comprise one or more servers (e.g., physical machines) that host one or more endpoints (e.g., virtual machines (VMs), workloads (applications)) 25. Virtual machines, applications and other endpoints may be deployed anywhere in the data center and can move freely across racks, rows, or different data center locations. That is, an endpoint 25 may migrate between the servers in one site or between servers cross sites.

The edge devices 18 at sites 10A and 10B may be, for example, a gateway, switch, router, or other network device. The edge devices 18 may be referred to herein as first hop routers (FHRs) since they are a first hop between the network sites 10A and 10B and the network 12. For description purpose only, the edge device 18 for the network site 10A may be referred to as XTR-FHR-W and the edge device 18 for the network site 10B may be referred to as XTR-FHR-E. The term 'first hop router' as used herein may refer to a router, switch, router/switch, gateway, or other network device operable to perform routing or forwarding functions. The edge device 18 may also be referred to as a LISP-VM xTR (router). In some embodiments, the LISP-VM router's IP address may be used as the locator (RLOC) for encapsulation of traffic to and from any movable endpoint attached to the router. For example, the edge device 18 may implement ingress tunnel router and egress tunnel router functions (e.g., operate as xTR). The edge devices 18 may be operable to receive packets from site-facing interfaces (e.g., endpoint 25) and encapsulate them for transmission to remote LISP sites (e.g., network sites 10A, 10B or 10C) or natively forward the packets to non-LISP sites (e.g., network site 10D). The edge devices 18 may also be operable to receive packets from core-facing interfaces (e.g., network 12), de-capsulate LISP packets, and deliver them to local endpoints at their network site 10A and 10B based on EIDs.

As described above, with the edge devices 14, 16 and 18 being LISP routers (ITR, ETR, xTR, PxTR, etc.), they may encapsulate, re-encapsulate or de-capsulate network traffic. An advantage of LISP is that the endpoint's EID can be constant for that endpoint in that it typically will not change, and when the endpoint moves, the RLOC is updated to catalog the move to the newly attached router (while the EID is unchanged). As such, the network 12 may further include one or more network devices to provide a mapping service. The mapping service may be provided by a mapping system that may include any number of map servers, map resolvers, or map databases distributed throughout the network. For example, the mapping system may comprise any number of physical or virtual devices located in one or more networks and may include one or more databases stored on one or more network devices. In one embodiment, as shown in FIG. 1, the mapping service may be provided by a mapping server 24 (e.g., a server/map resolver).

In one example, a map server (MS) may implement the mapping database distribution including accepting registration requests from the ETRs, aggregating the EID prefixes, and advertising the aggregated EID prefixes. The map resolver (MR) may accept encapsulated map-request messages sent by the ITRs, de-capsulate them, and then forward them toward the ETRs responsible for the EIDs being requested. Each ITR may maintain a cache of the mapping database entries that it needs at a particular time. It is to be understood that the mapping system described herein is only an example and that other mapping systems and mapping server 24 may be used without departing from the scope of the embodiments.

The mapping service (e.g., mapping server 24) may correlate the EID of an endpoint with a RLOC (e.g., its FHR). Accordingly, endpoint traffic may be routed between the RLOC routers of each endpoint with final address resolution being provided by the RLOC router for that endpoint (e.g., as configured by the mapping service). In some embodiments, this may simplify routing to be between a lesser number of RLOC routers (as opposed to endpoint-to-endpoint) since the ingress and egress traffic may be re-addressed at the endpoint's attached router.

One or more endpoints in the LISP sites, such as Host-B in site 10A, may be movable silent hosts. That is, they are not only movable but also do not register themselves with their first hop routers when they are up and running. In one embodiment, each of the movable silent hosts may be configured with an EID that belongs to a dynamic EID range. As shown in FIG. 1, Host-B may have an EID 10.10.10.100/32 and the EID may belong to a dynamic EID range, e.g., subnet 10.10.10.10/24 or dynamic EID prefix 10.10.10.10/24. The routers attached to sites configured to host such movable silent endpoints may be configured to register themselves with the mapping service (e.g., the mapping server 24), such that the mapping system may be aware that the dynamic EID range may be associated with these routers. For example, network sites 10A and 10B may both be configured to host endpoints having EIDs in the 10.10.10.10/24 subnet range. Thus, XTR-FHR-W and XTR-FHR-E may be configured to register themselves with the mapping server 24 such that the mapping server 24 may be aware that the dynamic EID range may be associated with XTR-FHR-W and XTR-FHR-E. In such an embodiment, the mapping server 24 may receive a map request for an EID and determine that the EID may be associated with a dynamic EID range but is associated with a RLOC. The mapping server 24 may forward the map request to any routers that have registered to be associated with the dynamic EID range. The routers receiving the map request may perform an address resolution for the EID in their respective sites to discover a host having the EID. The router that discovers the host may respond to the mapping server 24 and the mapping server 24 may respond to the map request with the responding router's identifier as the RLOC associated with the EID. It should be noted that two sites 10A and 10B configured to host endpoints in a dynamic EID range is just an example. In another embodiment, there may be three or more sites configured to host endpoints in a dynamic EID range and their respective edge devices (e.g., XTR routers) may all be configured to register with the mapping server (e.g., the mapping server 24) to be associated with the dynamic EID range.

Figure 2:
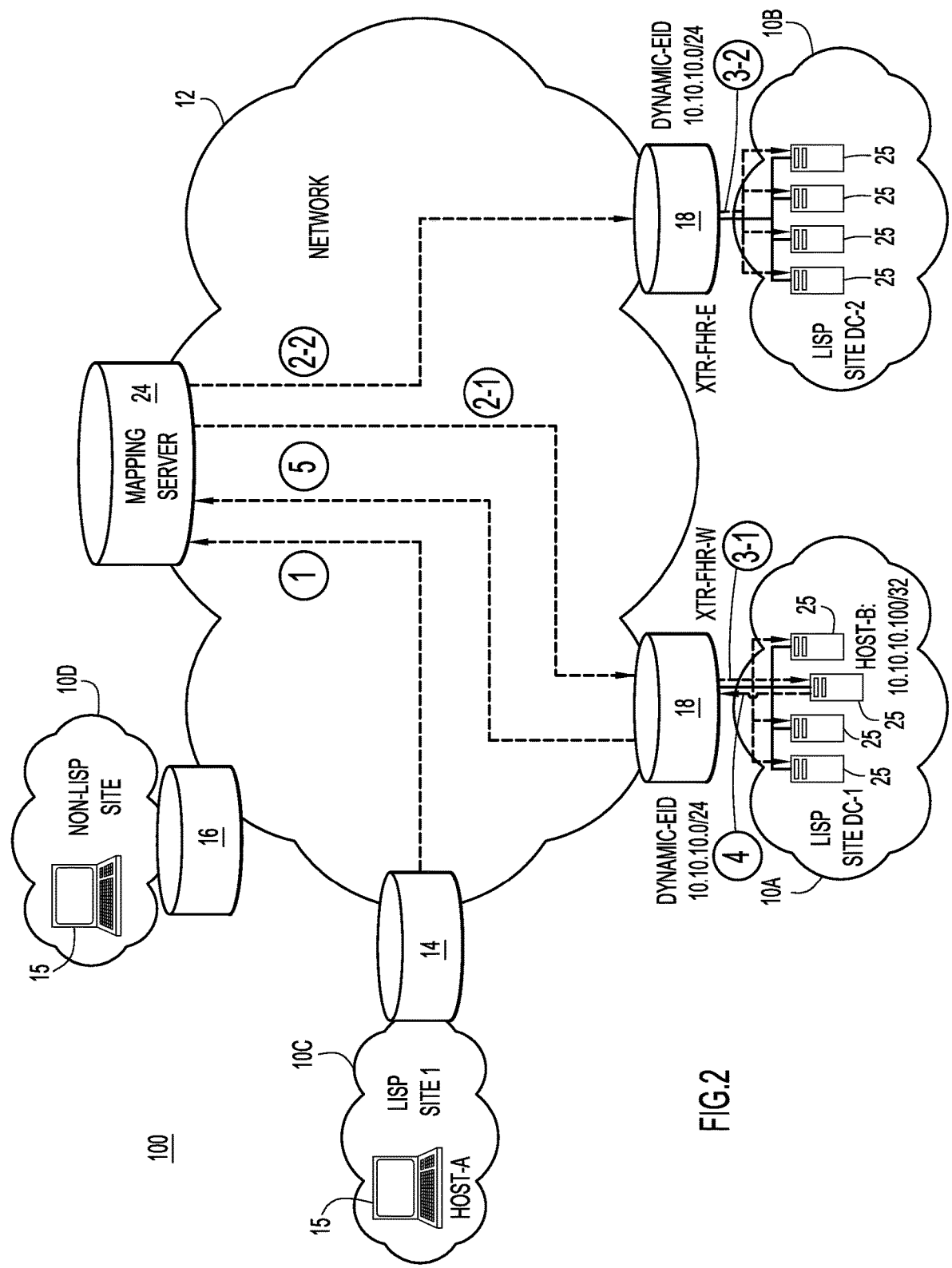
FIG. 2 is a system diagram illustrating how a movable silent host may be detected in a networking environment, according to an example embodiment.

With reference to FIG. 2, there is an illustration of how a movable silent host may be detected in the networking environment 100. For an endpoint in another site of the network 12, a host, such as the Host-A in site 10C may want to communicate with the silent endpoint Host-B. However, the edge device 14 does not know where Host-B is because Host-B is silent and there is no RLOC information for Host-B's EID. As shown in FIG. 2, at reference numeral 1, the edge device 14 for the site 10C may send a map request seeking a location identifier for the endpoint identifier of Host-B to the mapping server 24. The mapping server 24 may determine that the endpoint identifier belongs to a dynamic endpoint identifier range (e.g., dynamic EID prefix 10.10.10.0/24) associated with a plurality of routers (e.g., registered by both XTR-FHR-W and XTR-FHR-E) and Host-B has not been discovered. At reference numerals 2-1 and 2-2, the map request may be forwarded to the plurality of routers to discover a host having the endpoint identifier. At reference numerals 3-1 and 3-2, the plurality of routers may perform address resolution with their respective attached sites. In one embodiment, XTR-FHR-W and XTR-FHR-E may broadcast address resolution protocol (ARP) requests to their respective sites (e.g., LISP Site DC-1 and LISP Site DC-2). At reference numeral 4, Host-B with the endpoint 10.10.10.100/32 sitting in the LISP site DC-1 may respond to the ARP request sent by XTR-FHR-W. On receiving the ARP response from Host-B, XTR-FHR-W may discover Host-B successfully and then send a response (e.g., a map notify) to the mapping server 24 to report the discovery at reference numeral 5. The mapping server 24 may receive the notification from XTR-FHR-W reporting discovery of the host having the endpoint identifier and send an identifier of XTR-FHR-W to the first router as the location identifier for the endpoint identifier of Host-B.

Figure 3:
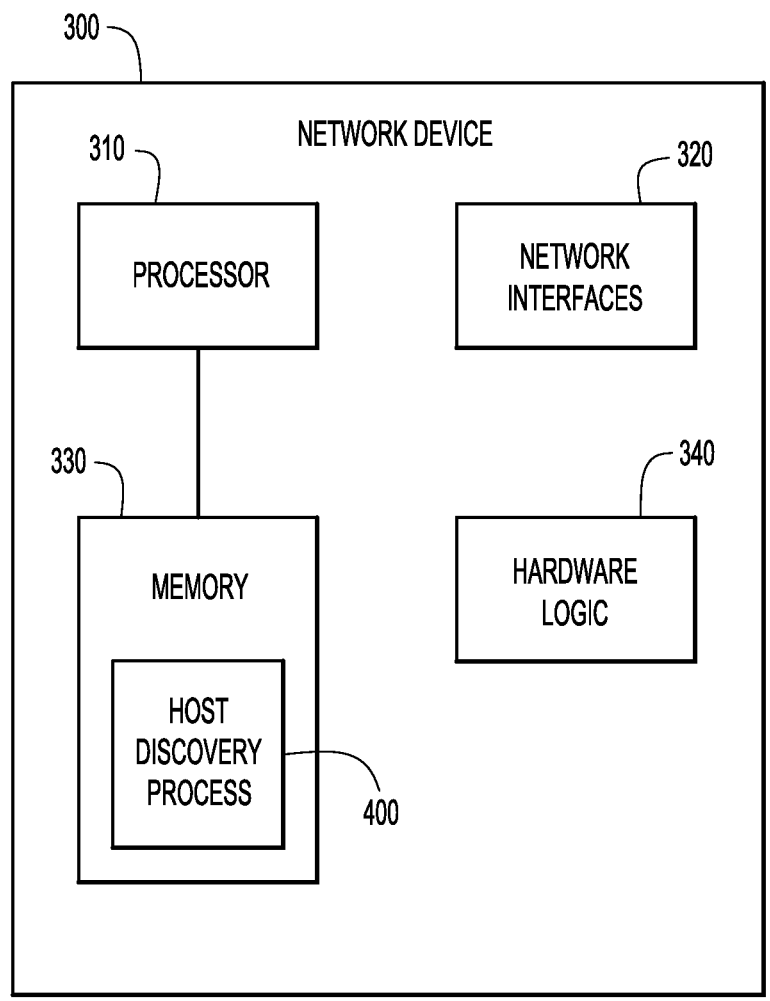
FIG. 3 is a block diagram of a mapping server in a network environment that is configured to discover a silent host, according to an example embodiment.

With reference to FIG. 3, there is an illustration of an example architecture of a network device configured to perform functions of the mapping server 24. The network device 300 may comprise a data processing device 310, a plurality of network interfaces 320, a memory 330 and hardware logic 340. Resident in the memory 330 is software for a host discovery process 400, which may include operational processes for locating silent hosts according to a silent host discovery process as described above, and is further described below in connection with FIG. 4. Process 400 may also be implemented in hardware using hardware logic 340, or be implemented in a combination of both hardware and software.

Figure 4:
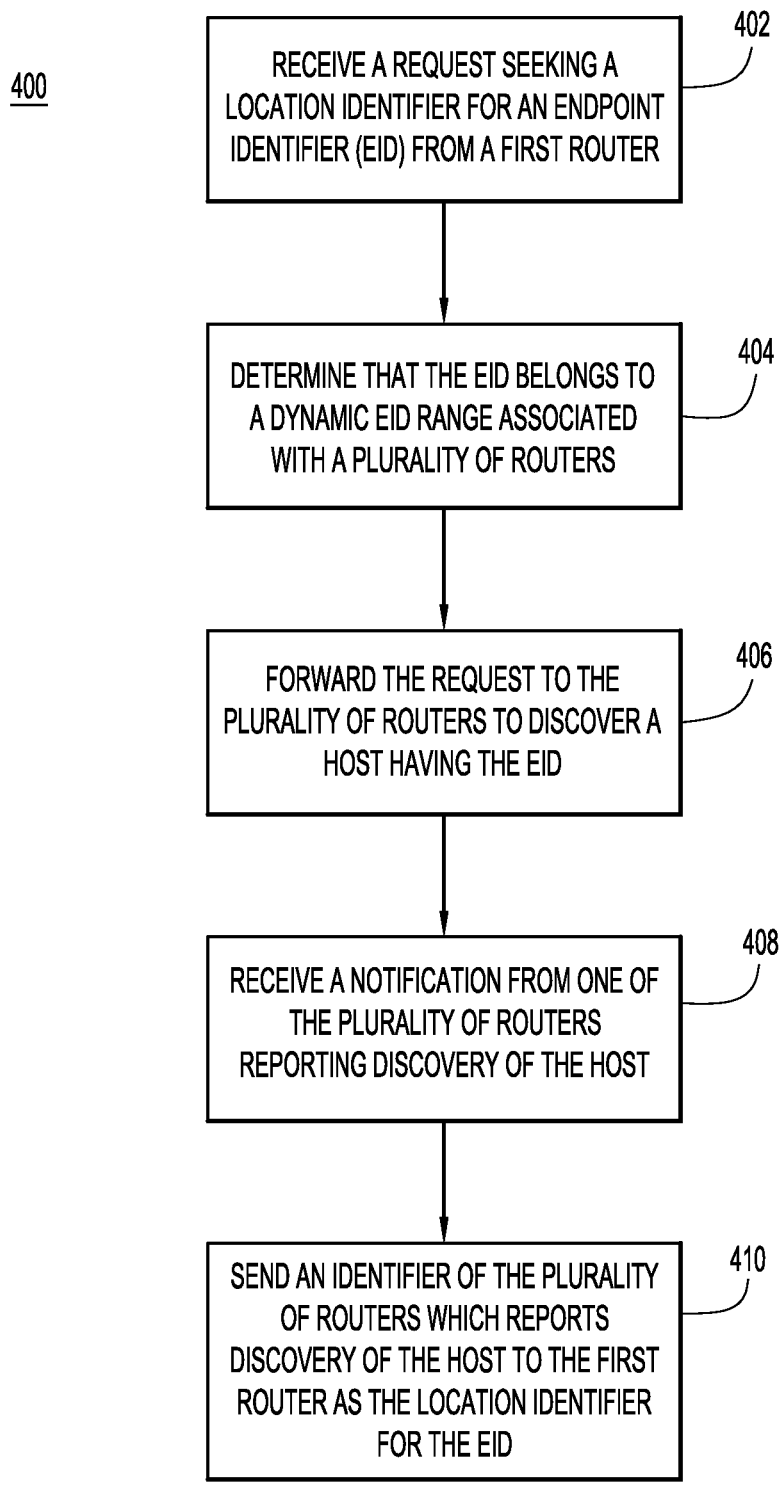
FIG. 4 is a flow chart illustrating, at a high-level, operations performed to detect a silent host using a mapping server, according to an example embodiment.

The data processing device 310 is, for example, a microprocessor, a microcontroller, systems on a chip (SOCs), or other fixed or programmable logic. The data processing device 310 is also referred to herein simply as a processor. The memory 330 may include read only memory (ROM), random access memory (RAM), magnetic disk storage media devices, optical storage media devices, flash memory devices, electrical, optical, or other physical/tangible memory storage devices. The memory 330 may be separate or part of the processor 310. Thus, in general, the memory 330 may comprise one or more tangible (e.g., non-transitory) computer readable storage media (e.g., a memory device) encoded with software comprising computer executable instructions and when the software is executed (by the processor 310) it is operable to perform the operations described herein in connection with the mapping server 24 in the network environment 100. To this end, the memory 330 may store software instructions that, when executed by the processor 310, cause the processor 310 to perform a variety of LISP operations including silent host discovery operations described herein. For example, the memory 330 may store instructions for the processor 310 to perform the operations described herein in connection with FIGS. 1-2 above and the process 400 as shown in FIG. 4 and described below.

The network interfaces 320 enable communication over network 12 as shown in FIGS. 1 and 2. As such, the network interfaces 320 may include a plurality of communication ports configured to receive/send packets from/to the network 12. The plurality of communication ports may include wired and/or wireless ports.

The functions of the processor 310 may be implemented by a processor or computer readable tangible non-transitory medium encoded with instructions or by logic encoded in one or more circuits (e.g., embedded logic such as an application specific integrated circuit (ASIC), digital signal processor (DSP) instructions, software that is executed by a processor, etc.), wherein the memory 330 stores data used for the computations or functions described herein (and/or to store software or processor instructions that are executed to carry out the computations or functions described herein). Thus, functions of the process 400 may be implemented with fixed logic or programmable logic (e.g., software or computer instructions executed by a processor or field programmable gate array (FPGA)).

Hardware logic 340 may be used to implement LISP functions (e.g., MR/MS and/or silent host discovery functions) and perform hardware programming, e.g., at an ASIC level, without involving the switch Central Processing Unit (CPU), e.g., processor 310, or a separate processor associated with one of the network interfaces 320. The hardware logic 340 may be coupled to processor 310 or be implemented as part of processor 310. In some embodiments, the hardware logic 340 may also include one or more application specific integrated circuits that include buffers, queues, and other control logic for performing packet forwarding operations.

It should be appreciated that in other embodiments, the network device 300 may include fewer or more modules apart from those shown in FIG. 3. In another example, the host discovery process 400 may be in the form of firmware that is processed by Application Specific Integrated Circuits (ASICs), which may be integrated into a circuit board. Alternatively, the host discovery process 400 may be in the form of one or more logic blocks included in a programmable logic device (e.g., a field-programmable gate array). Moreover, the network device 300 may be adapted, and/or additional structures may be provided, to provide alternative or additional functionalities beyond those specifically discussed in reference to FIG. 3. Modifications or additions to the structures described in relation to FIG. 3 to implement these alternative or additional functionalities are envisioned without departing from the scope and spirit of the embodiments presented herein.

Referring to FIG. 4, an example of a flowchart is shown that generally depicts the operations of the host discovery process 400 that facilitates discovery of a silent host having an EID not associated with any RLCO, according to the techniques described herein. Reference is also made to FIGS. 1 and 2 for purposes of the description of FIG. 4. At 402, at a network mapping server device in a network, a request may be received seeking a location identifier for an endpoint identifier from a first router. For example, the mapping server 24 may receive a map request from the edge device 14 for the site 10C seeking a location identifier for an endpoint identifier of Host-B. The mapping server device may be part of a mapping service that maintains mappings associating device identifiers (and their functions) to locations, e.g., EID to RLOC mappings. At 404, it may be determined that the endpoint identifier is associated with a dynamic endpoint identifier range associated with a plurality of routers. As described above, XTR-FHR-W and XTR-FHR-E may register themselves with the mapping server 24 such that the mapping server 24 may receive registration of the dynamic endpoint identifier range from XTR-FHR-W and XTR-FHR-E and store data for the registration to associate the dynamic endpoint identifier range with XTR-FHR-W and XTR-FHR-E. The mapping server 24 may determine that the endpoint identifier in the map request is associated with the dynamic endpoint identifier range associated with XTR-FHR-W and XTR-FHR-E.

At 406, the request may be forwarded to the plurality of routers to discover a host having the endpoint identifier. In the example of the network environment 100, the mapping server 24 may forward the map request it received from the edge device 14 of the site 10C to XTR-FHR-W and XTR-FHR-E to discover the host having the EID. At 408, a notification may be received from one of the plurality of routers reporting discovery of the host. As shown in FIG. 2, Host-B having the EID may be located in the site 10A and a notification may be received by the mapping server 24 from XTR-FHR-W reporting the discovery of Host-B. At 410, an identifier of the plurality of routers which reports discovery of the host may be sent to the first router as the location identifier for the EID. As described above, the mapping server 24 may sent the identifier of XTR-FHR-W as the RLOC associated with the EID of Host-B to the edge device 14 of site 10C.

Figure 5:
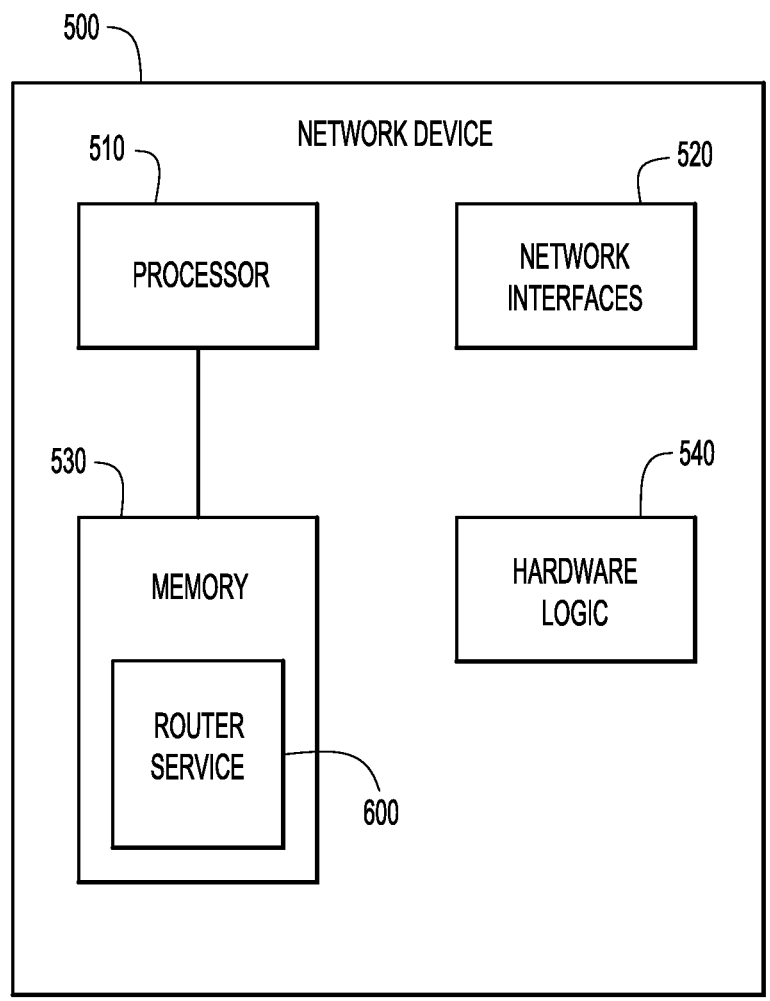
FIG. 5 is a block diagram of a router in a network environment that is configured to discover a silent host, according to an example embodiment.

With reference to FIG. 5, there is an illustration of an example architecture of a network device 500 configured to serve as an edge device (e.g., edge devices 14 or 18). The network device 500 may comprise a data processing device 510, a plurality of network interfaces 520, a memory 530 and hardware logic 540. Resident in the memory 530 is software for a router process 600, which may include operational processes regarding locating silent hosts according to a silent host discovery process as described above, and is further described below in connection with FIG. 6. The data processing device 510 may be similar to the data processing device 310 shown in FIG. 3. The memory 530 may be similar to the memory 330. Instructions for performing the process 600 may be stored in the memory 530 for execution by the processor 510 such that when executed by the processor, causes the processor to perform the operations describe herein in connection with FIGS. 1, 2 and 6. Process 600 may also be implemented in hardware using hardware logic 540 (e.g., ASIC or FPGA), or be implemented in a combination of both hardware and software. The network interfaces 520 may be network ports that can send and receive packets in a network, and thereby enable any endpoints attached to the edge device to communicate over the network 12 as shown in FIGS. 1 and 2.

Figure 6:
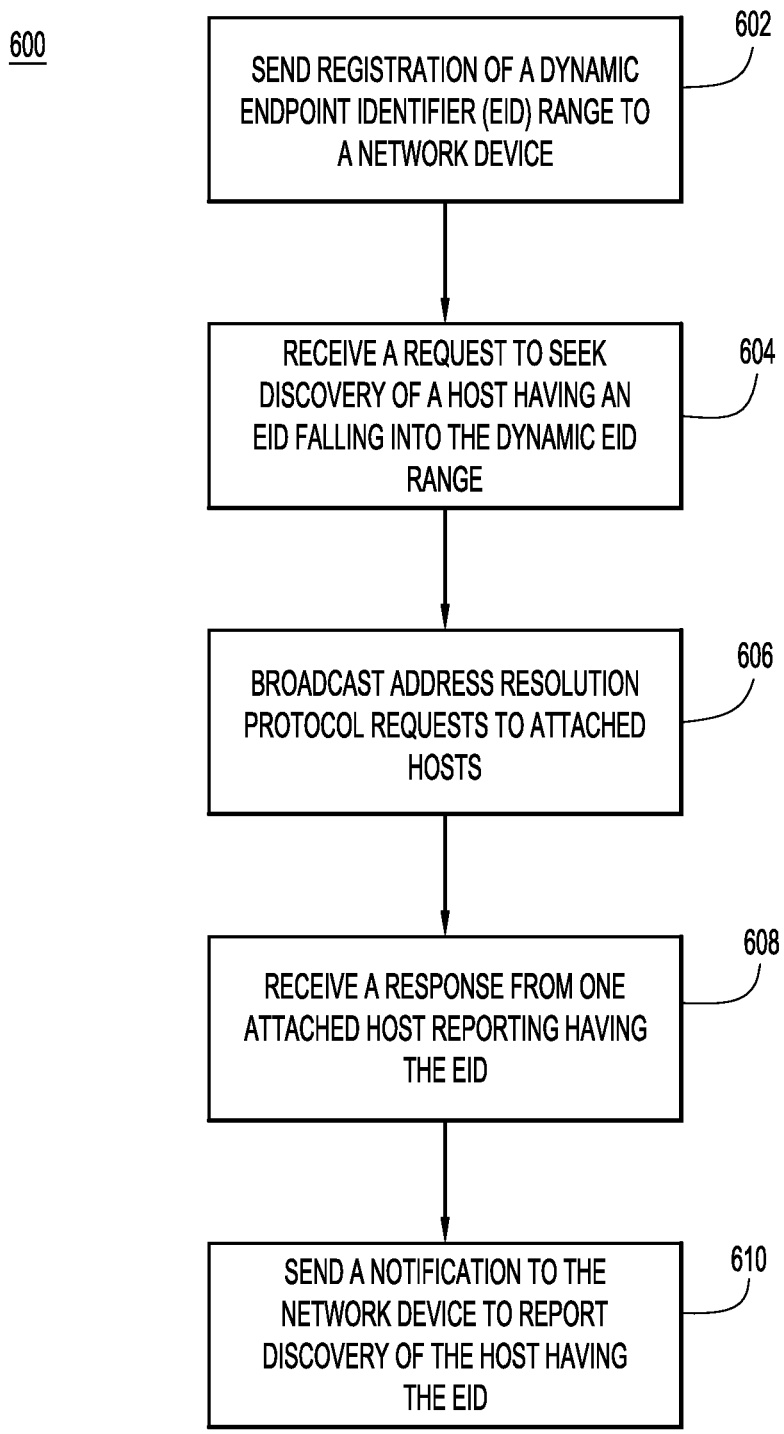
FIG. 6 is a flow chart illustrating, at a high-level, operations performed to detect a silent host using a router, according to an example embodiment.

Referring to FIG. 6, an example of a flowchart is shown that generally depicts the operations of process 600 that a router may perform for facilitating discovery of a silent host according to the techniques described herein. Reference is also made to FIGS. 1 and 2 for the description of FIG. 6. At 602, a router may send registration of a dynamic identifier range to a network device. As described above, the edge devices XTR-FHR-W and XTR-FHR-E may be routers for the sites 10A and 10B, and may both be configured with a dynamic EID prefix 10.10.10.10/24. XTR-FHR-W and XTR-FHR-E may register themselves with the mapping server 24 so that the mapping server 24 will store data for the registration to associate the dynamic endpoint identifier prefix with XTR-FHR-W and XTR-FHR-E. At 604, a request to seek discovery of a host having an EID in the dynamic EID range may be received. As shown in FIG. 2 and described above, a map request looking for Host-B may be forwarded by the mapping server 24 and received by XTR-FHR-W and XTR-FHR-E. At 606, the routers received the request seeking discovery of a silent host may broadcast address resolution protocol requests to the attached hosts. XTR-FHR-W and XTR-FHR-E may broadcast ARP requests in sites 10A and 10B, respectively. At 608, a response from one attached host may be received reporting it has the EID. For example, XTR-FHR-W may receive a response to the ARP requests in site 10A from Host-B reporting that the EID belongs to Host-B. At 610, a notification may be sent to the network device to report discovery of the host having the EID. XTR-FHR-W, for example, may send a map notify to the mapping server 24 reporting the discovery of Host-B so that the mapping server 24 may associate the EID of Host-B with an identifier of XTR-FHR-W as the RLOC.

The techniques provided herein may provide a way for detecting movable silent hosts in a locator identifier separation protocol implementation. In the embodiments described herein, few changes need to be made to any existing implementation of a locator identifier separation protocol and existing messaging in the locator identifier separation protocol may be reused.

In summary, in one form, a method is provided comprising: receiving, at a network device, a request seeking a location identifier for an endpoint identifier from a first router; determining that the endpoint identifier belongs to a dynamic endpoint identifier range associated with a plurality of routers; forwarding the request to the plurality of routers to discover a host having the endpoint identifier; receiving a notification from one of the plurality of routers reporting discovery of the host having the endpoint identifier; and sending an identifier of the one of the plurality of routers which reports discovery of the host to the first router as the location identifier for the endpoint identifier.

In summary, in another form, an apparatus is provided comprising: one or more network ports configured to send/receive data packets to/from a communication network; a processor coupled to the network ports, and configured to: receive a request seeking a location identifier for an endpoint identifier from a first router; determine that the endpoint identifier belongs to a dynamic endpoint identifier range associated with a plurality of routers; forward the request to the plurality of routers to discover a host having the endpoint identifier; receive a notification from one of the plurality of routers reporting discovery of the host having the endpoint identifier; and send an identifier of the one of the plurality of routers which reports discovery of the host to the first router as the location identifier for the endpoint identifier.

In summary, in yet another form, a non-transitory computer readable storage media is provided that stores instructions that, when executed by a processor of a network device, cause the processor to: receive a request seeking a location identifier for an endpoint identifier from a first router; determine that the endpoint identifier belongs to a dynamic endpoint identifier range associated with a plurality of routers; forward the request to the plurality of routers to discover a host having the endpoint identifier; receive a notification from one of the plurality of routers reporting discovery of the host having the endpoint identifier; and send an identifier of the one of the plurality of routers which reports discovery of the host to the first router as the location identifier for the endpoint identifier.

Described above are examples. The concepts described herein may be embodied in other specific forms without departing from the spirit or essential characteristics thereof. The foregoing examples are therefore to be considered in all respects illustrative and not meant to be limiting. Accordingly, it is intended to embrace all such alterations, modifications and variations that fall within the spirit and scope of any claims filed in applications claiming priority hereto interpreted in accordance with the breadth to which they are fairly, legally and equitably entitled.

What is claimed is:

1. A method comprising:
    receiving, at a network device, a registration from each of a plurality of endpoint routers to associate each of the plurality of endpoint routers with a dynamic endpoint identifier range, wherein the dynamic endpoint identifier range is associated with a plurality of silent hosts that do not register with any of the plurality of endpoint routers when connected to one or more of the plurality of endpoint routers;
    receiving, from a first endpoint router at the network device, a request seeking a location identifier for an endpoint identifier of one of the plurality of silent hosts;
    determining that the endpoint identifier belongs to the dynamic endpoint identifier range associated with each of the plurality of endpoint routers;
    forwarding the request to the plurality of endpoint routers to discover a host having the endpoint identifier;
    receiving a notification from one of the plurality of endpoint routers reporting discovery of the host having the endpoint identifier; and
    sending an identifier of the one of the plurality of endpoint routers which reports discovery of the host to the first endpoint router as the location identifier for the endpoint identifier.

2. The method of claim 1, further comprising:
    storing data for the registrations to associate the dynamic endpoint identifier range with each of the plurality of endpoint routers.

3. The method of claim 1, wherein the network device is a mapping server implementing a Locator/identifier (ID) Separation Protocol (LISP), and the first endpoint router and the plurality of endpoint routers are LISP routers.

4. The method of claim 3, wherein the request is a map request and the notification is a map notify in a LISP network, and the plurality of endpoint routers are configured to use Address Resolution Protocol (ARP) to discover the host having the endpoint identifier.

5. The method of claim 3, wherein the host having the endpoint identifier is a virtual machine and is movable between different sites attached to different endpoint routers of the plurality of endpoint routers.

6. The method of claim 3, wherein the host is a silent host that does not advertise its location or register itself with the mapping server.

7. The method of claim 1, wherein the dynamic endpoint identifier range is a subnet defined by a subnet mask.

8. An apparatus comprising:
    one or more network ports to send and receive data packets to and from a communication network; and
    a processor coupled to the network ports, and configured to:
        receive a registration from each of a plurality of endpoint routers to associate each of the plurality of endpoint routers with a dynamic endpoint identifier range, wherein the dynamic endpoint identifier range is associated with a plurality of silent hosts that do not register with any of the plurality of endpoint routers when connected to one or more of the plurality of endpoint routers;
        receive, from a first endpoint router, a request seeking a location identifier for an endpoint identifier of one of the plurality of silent hosts;
        determine that the endpoint identifier belongs to the dynamic endpoint identifier range associated with each of the plurality of endpoint routers;
        forward the request to the plurality of endpoint routers to discover a host having the endpoint identifier;
        receive a notification from one of the plurality of endpoint routers reporting discovery of the host having the endpoint identifier; and
        send an identifier of the one of the plurality of endpoint routers which reports discovery of the host to the first endpoint router as the location identifier for the endpoint identifier.

9. The apparatus of claim 8, wherein the processor is further configured to:
    store data for the registrations to associate the dynamic endpoint identifier range with each of the plurality of endpoint routers.

10. The apparatus of claim 8, wherein the apparatus is a mapping server implementing a Locator/identifier (ID) Separation Protocol (LISP), and the first endpoint router and the plurality of endpoint routers are LISP routers.

11. The apparatus of claim 10, wherein the request is a map request and the notification is a map notify in a LISP network, and the plurality of endpoint routers are configured to use Address Resolution Protocol (ARP) to discover the host having the endpoint identifier.

12. The apparatus of claim 10, wherein the host having the endpoint identifier is a virtual machine and is movable between different sites attached to different endpoint routers of the plurality of endpoint routers.

13. The apparatus of claim 10, wherein the host is a silent host that does not advertise its location or register itself with the mapping server.

14. The apparatus of claim 8, wherein the dynamic endpoint identifier range is a subnet defined by a subnet mask.

15. A non-transitory computer readable storage media encoded with instructions that, when executed by a processor of a network device, cause the processor to:
    receive a registration from each of a plurality of endpoint routers to associate each of the plurality of endpoint routers with a dynamic endpoint identifier range, wherein the dynamic endpoint identifier range is associated with a plurality of silent hosts that do not register with any of the plurality of endpoint routers when connected to one or more of the plurality of endpoint routers;
    receive, from a first endpoint router, a request seeking a location identifier for an endpoint identifier of one of the plurality of silent hosts;

determine that the endpoint identifier belongs to the dynamic endpoint identifier range associated with each of the plurality of endpoint routers;

forward the request to the plurality of endpoint routers to discover a host having the endpoint identifier;

receive a notification from one of the plurality of endpoint routers reporting discovery of the host having the endpoint identifier; and send an identifier of the one of the plurality of endpoint routers which reports discovery of the host to the first endpoint router as the location identifier for the endpoint identifier.

16. The non-transitory computer readable storage media of claim 15, further comprising instructions to cause the processor to:

store data for the registrations to associate the dynamic endpoint identifier range with each of the plurality of endpoint routers.

17. The non-transitory computer readable storage media of claim 15, wherein the network device is a mapping server implementing a Locator/identifier (ID) Separation Protocol (LISP), and the first endpoint router and the plurality of endpoint routers are LISP routers.

18. The non-transitory computer readable storage media of claim 17, wherein the request is a map request and the notification is a map notify in a LISP network, and the plurality of endpoint routers are configured to use Address Resolution Protocol (ARP) to discover the host having the endpoint identifier.

19. The non-transitory computer readable storage media of claim 17, wherein the host having the endpoint identifier is a virtual machine and is movable between different sites attached to different endpoint routers of the plurality of endpoint routers, and wherein the host is a silent host that does not advertise its location or register itself with the mapping server.

20. The non-transitory computer readable storage media of claim 15, wherein the dynamic endpoint identifier range is a subnet defined by a subnet mask.

* * * * *